United States Patent [19]

Koning et al.

[11] Patent Number: 5,371,868
[45] Date of Patent: Dec. 6, 1994

[54] METHOD AND APPARATUS FOR DERIVING ADDRESSES FROM STORED ADDRESS INFORMATION FOR USE IN IDENTIFYING DEVICES DURING COMMUNICATION

[75] Inventors: G. Paul Koning, Brookline, N.H.; Henry S. Yang, Andover; William Hawe, Pepperell, both of Mass.

[73] Assignee: Digital Equipment Corporation, Maynard, Mass.

[21] Appl. No.: 184,366

[22] Filed: Jan. 21, 1994

Related U.S. Application Data

[63] Continuation of Ser. No. 569,815, Aug. 20, 1990, abandoned.

[51] Int. Cl.$^5$ .............................................. G06F 12/02
[52] U.S. Cl. ...................... 395/400; 364/DIG. 7; 364/238.1; 395/425; 370/60; 370/61
[58] Field of Search ... 364/200 MS File, 900 MS File; 395/400, 425; 370/60, 61

[56] References Cited

U.S. PATENT DOCUMENTS

| | | | |
|---|---|---|---|
| 4,627,052 | 12/1986 | Hoare et al. | 370/88 |
| 4,637,013 | 1/1987 | Nakamura | 370/85 |
| 4,819,165 | 4/1989 | Lenoski | 395/400 |
| 4,922,503 | 5/1990 | Leone | 370/85.13 |
| 5,060,228 | 10/1971 | Tsutsui et al. | 370/85.13 |
| 5,079,738 | 6/1992 | Bockenfield | 395/800 |
| 5,150,464 | 9/1992 | Sidhu et al. | 395/200 |

*Primary Examiner*—Joseph L. Dixon
*Assistant Examiner*—Hiep T. Nguyen
*Attorney, Agent, or Firm*—Cesari and McKenna

[57] ABSTRACT

A plurality of physical addresses are derived from address information stored in an address memory of a bridge or other multi-port communication device, wherein the stored address information does not directly specify all the addresses. In a first embodiment, the stored addressing information specifies a single address value from a first block of preferably consecutive address values. A processor uses the first address value to derive a second address value from a second, different block of preferably consecutive address values, and then assigns both as, e.g., port addresses. In a second embodiment of the invention, the address memory stores address information which specifies a range of preferably consecutive address values, for instance, the first and last address values of the range. A processor fetches these address values from the address memory, identifies all address values within the range, and assigns them as, e.g., port addresses.

18 Claims, 6 Drawing Sheets

| MEMORY OCTET | BIT 7 ... BIT 0 | |
|---|---|---|
| 0 | FIRST ADDRESS OCTET | 0 |
| 1 | " " | 1 |
| 2 | " " | 2 |
| 3 | " " | 3 |
| 4 | " " | 4 |
| 5 | " " | 5 |
| 6 | FIRST ADDR. CHECKSUM OCTET | 1 |
| 7 | " " | 2 |
| 8 | FIRST ADDR. CHECKSUM OCTET | 1 |
| 9 | " " | 2 |
| 10 | FIRST ADDRESS OCTET | 5 |
| 11 | " " | 4 |
| 12 | " " | 3 |
| 13 | " " | 2 |
| 14 | " " | 1 |
| 15 | " " | 0 |
| 16 | LAST ADDRESS OCTET | 0 |
| 17 | " " | 1 |
| 18 | " " | 2 |
| 19 | " " | 3 |
| 20 | " " | 4 |
| 21 | " " | 5 |
| 22 | LAST ADDR. CHECKSUM OCTET | 1 |
| 23 | " " | 2 |
| 24 | TEST PATTERN | = FF |
| 25 | " " | = 00 |
| 26 | " " | = AA |
| 27 | " " | = 55 |
| 28 | " " | = 00 |
| 29 | " " | = FF |
| 30 | " " | = 55 |
| 31 | " " | = AA |

METHOD AND APPARATUS FOR DERIVING ADDRESSES FROM STORED ADDRESS INFORMATION FOR USE IN IDENTIFYING DEVICES DURING COMMUNICATION this is a continuation of Ser. No. 07/569,815, filed Aug. 20, 1990, now abandoned.

FIELD OF THE INVENTION

This invention relates generally to data communication, and more particularly to improved addressing techniques suitable for use in bridges, routers and other multi-port communication devices that enhance connectivity to and between computer networks. In addition, the invention can be used to advantage in any of a variety of other devices utilizing multiple addresses for any purpose.

BACKGROUND OF THE INVENTION

In a known approach to network addressing, all stations on a network are assigned unique addresses. To this end, different blocks of addresses are assigned to different manufacturers, who are responsible for assigning specific addresses from their blocks to the products they manufacture. The assigned product addresses typically are stored in memories, usually read-only-memories ("ROM's"), on-board the products.

For example, for a bridge, each port to which an attachment can be connected is assigned an address from the manufacturer's block of addresses, and the central logic unit of the bridge often is assigned such an address as well. Each assigned address is unique on the networks connected to the bridge, and, of course, distinct from the other bridge addresses. The addresses assigned to the bridge ports each serve to identify the associated port, and accordingly is referred to as a "port address."

Typically, the physical addresses of the bridge ports and, if necessary, the central logic unit are stored in separate address memories in the bridge, for instance, in two or three separate ROM's implemented on two or three separate semiconductor chips. In other words, each address-ROM chip typically contains a single, unique address. This address is available for use, e.g., for communication purposes, provided, however, that it was accurately stored and is accurately recoverable.

Known address-ROM chips are carefully designed and manufactured so as to assure the accurate storage and recovery of address information specifying the assigned addresses. Consequently, the address information stored in such a chip typically includes redundant copies of the assigned address, and other data which, during data recovery, permits the detection of any errors in the stored information. Refined manufacturing techniques, including strict quality assurance procedures have been established by manufacturers of address-ROM chips to minimize the likelihood of manufacturing defects.

While such known addressing schemes have proven useful for their intended purposes, it would be desirable to provide more efficient approaches to the storage of the addresses assigned to a single product, i.e., approaches which preferably utilize fewer address-ROM chips while maintaining or improving the degree of flexibility, versatility and reliability presently realized by having each chip contain a single address. Not only would such approaches reduce the costs, space, and power consumption associated with the address-ROM chips themselves by requiring fewer in each product, but also of related hardware used in conjunction therewith. In addition, such new approaches preferably use the same or similar address-ROM chips as presently utilized so as to take advantage of the above-described chip fabrication techniques which have been so highly developed.

SUMMARY OF THE INVENTION

The invention resides in techniques for deriving a plurality of physical addresses from, for instance, one or two address values stored in an address memory, e.g., on a single address-ROM chip. Thus, the invention processes and expands and the stored address information into a complete set of addresses. These addresses are then stored external to the address-memory chip, and can be used subsequently for identification purposes, e.g., as source or destination addresses for purposes of communication.

In a first embodiment, the addressing information stored in the address memory specifies a single address value from a first range or group of preferably consecutive address values. A processor computes a second address value from the stored first address value. The second address value preferably is from a second, different range of preferably consecutive address values. The second address range can be called a "shadow" range, and preferably does not overlap, i.e., share address values in common with, the first range. In other words, this technique yields first and second unique addresses derived from the stored address information, which information directly specifies only a single address.

This embodiment of the invention is particularly suited for use wherever two addresses are required, and it is desirable to use a conventional address-ROM chip as described above. Thus, the invention can be practiced advantageously without requiring either modification of existing address memory chips or the manufacturing techniques used to make such chips.

In a second embodiment of the invention, the address memory stores address information which specifies a range of preferably consecutive address values, for instance, the information contains the first and last address values of the range. A processor fetches these addresses values from the address memory, identifies all address values within the range, and assigns them to, e.g., the ports and, if desired, the central logic unit of the bridge, in accordance with an address assignment algorithm stored in memory locations, e.g., on-board the device.

Thus, for instance, where the address information specifies an address value range having four address values, the processor can assign a unique address to each of four bridge ports, or to each of three bridge ports plus a unique address to the bridge central logic unit.

Advantageously, in this embodiment, only two addresses are stored in the address memory. By changing one or both of these stored addresses, any number of addresses can be made available for use by the device. This embodiment thus provides maximal flexibility in the number of addresses that the address memory can be made to specify, and efficiency in the use of address memory space, while using address memory chips requiring minimal changes from existing designs and manufacturing techniques.

The advantages of this second embodiment can be appreciated more readily in conjunction with, e.g., bridge implementations having multiple (e.g., 16, 32, 64 or even 128) ports to be identified with addresses. The reduction in the amount of printed circuit board space, power requirements and chip costs that can be realized by this embodiment are manifest for such implementations.

In summary, both of the above-described embodiments provide for the dynamic derivation of addresses from address information stored on an address-ROM chip. These techniques find particular utility in bridges and other packet relaying devices and result in the use of fewer address-ROM chips than in known, presently commercialized versions of such devices. These techniques also enhance network management through the use of stored and derived addresses having logical, mathematical relationships, which can be readily recognized as belonging to the same packet relaying device.

BRIEF DESCRIPTION OF THE DRAWINGS

The above and further advantages of the invention may be better understood by referring to the following description in conjunction with the accompanying drawings, in which:

FIG. 3 is a flow chart of an algorithm for computing a shadow address value from the address value stored in the address memory depicted in FIG. 2a;

DETAILED DESCRIPTION OF ILLUSTRATIVE EMBODIMENTS

Figure 1:
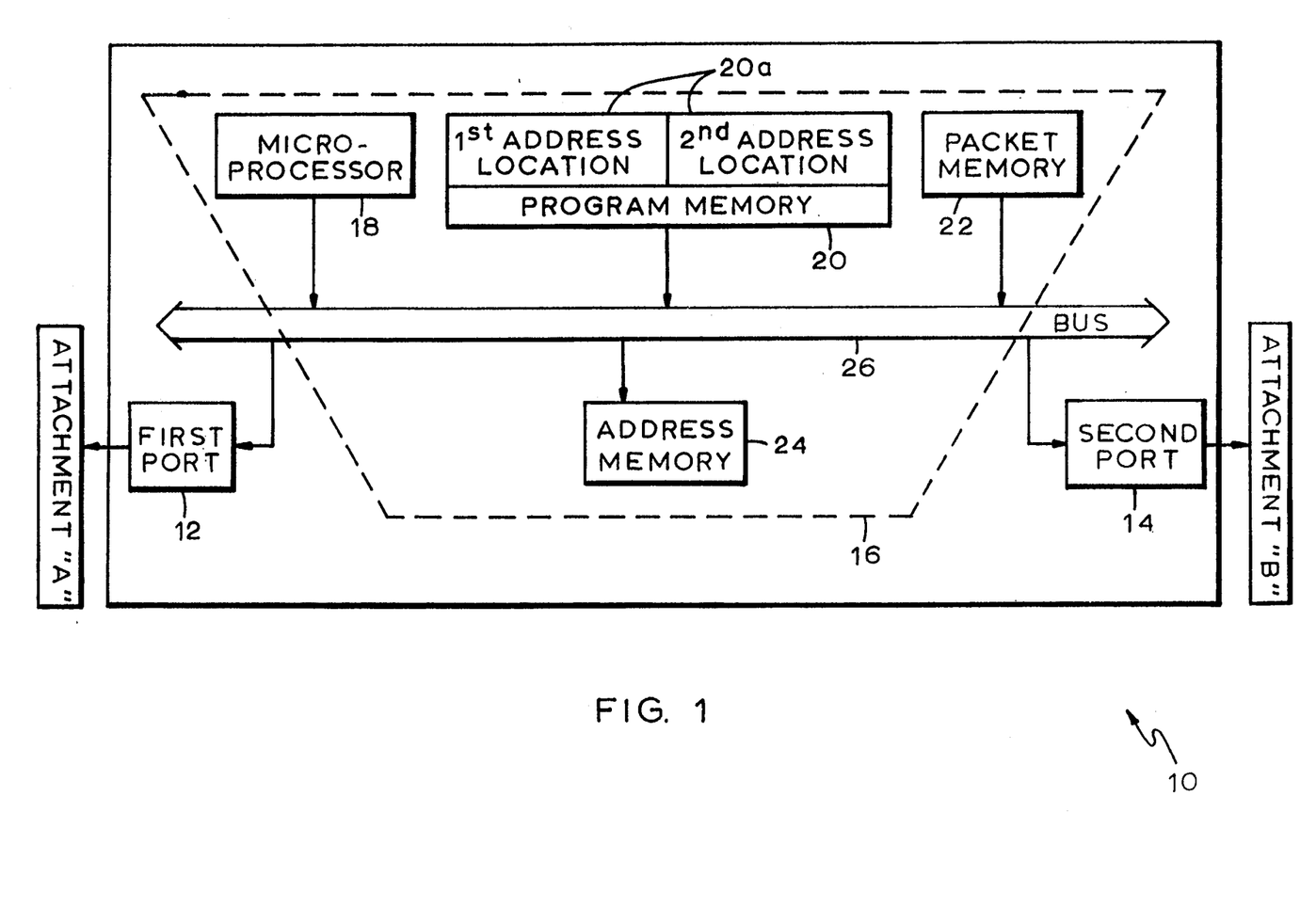
FIG. 1 is a block diagram of a bridge in accordance with the invention.

With reference to FIG. 1, a bridge 10 has first and second ports 12, 14, through which packets are transmitted (i.e., received and sent) bi-directionally to respective first and second networks A, B. The bridge 10 also includes, in a central logic unit 16, a microprocessor 18 for controlling the operation of the bridge 10. Bridge operation includes processing of packets in accordance with a computer program stored in a program memory 20. The bridge 10 is a "store and forward" type device; accordingly, a packet memory 22 is provided to store packets while being processed by the microprocessor 16. Also, the bridge 10 has an address memory 24, for example, a 32×8 programmable read-only-memory ("PROM"), for storing address information. These bridge components are interconnected by a main bus 26.

In accordance with the invention, two or more physical addresses are derived by the microprocessor 18 from the stored address information. After deriving the addresses, the microprocessor 18 assigns the addresses to the ports 12, 14, and, if desired, to the central logic unit 16, in accordance with an address assignment algorithm stored, e.g., in the program memory 20. Any such address assignment scheme is appropriate, so long as the addresses uniquely identify in a consistent manner the ports 12, 14 and, if desired, the central logic unit 16. The assigned addresses are then available for use as, for example, source or destination addresses corresponding to the ports 12, 14, and, where desired, to the central logic unit 16 of the bridge 10.

In a first embodiment, the microprocessor 18 reads a single address value stored in the address memory 24, and computes a set of physical addresses using an algorithm stored, e.g., in the program memory 20. One of the computed physical addresses can be the stored address value, itself. One or more other physical addresses are computed by mathematically manipulating the stored address value, e.g., by adding a constant to the stored address value. In a typical application, the addresses are of a 48-bit format conforming to Ethernet standards, and susceptible of use as Ethernet addresses.

Figure 2A:
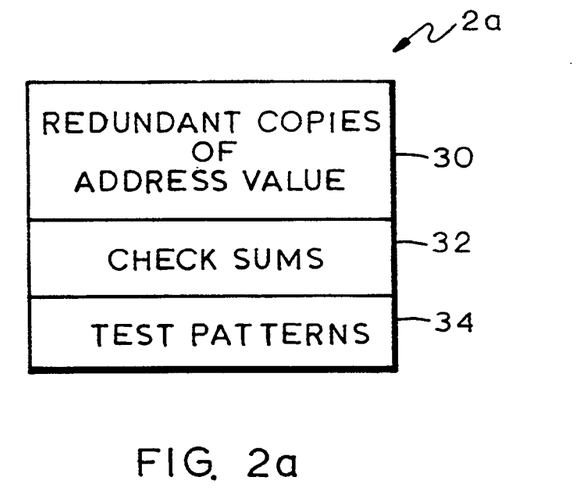
FIGS. 2a and 2b show different formats and contents for the address memory of FIG. 1 in accordance with alternative embodiments of the invention.

In accordance with this first embodiment, the address memory 24 preferably stores the address value in an address data structure 24a as shown in FIG. 2a. The address data structure 24a includes: (i) a first set of fields 30 providing redundant copies of a single 48-bit address value, (ii) a second set of fields 32 providing checksums of that value for purposes of error detection, and (iii) a third set of fields 34 providing test patterns for purposes also of error detection. The checksum and test pattern fields 32, 34 assure accurate storage and retrieval of the address value. The manner of using such error detection techniques are within the skill of the art.

The specific format for the fields 30–34 can be conventional, because, like the bridge addressing memories of the prior art as described above, only a single address value need be stored in the address memory 24 of this embodiment of the invention. In fact, this embodiment of the invention can be practiced using a conventional address-PROM chip containing information consisting essentially of only address information, which offers a distinct advantage in the conservation of hardware design.

While the format of the address memory 24 can be conventional, the technique of using its content to derive addresses not directly specified therein is novel.

Preferably, the single, stored address value in the address memory 24 is of a pre-determined block of values, i.e., a first range of preferably consecutive values. Corresponding to and at a fixed offset from this first range of address values is a second range of preferably consecutive values, called herein the "shadow range." The shadow address range is preferably the same size as the first range; consequently, there is a one-to-one correspondence between address values in the first and shadow ranges.

While one of the address values computed by the microprocessor 18 is preferably the same as the stored address value, the other computed value is obtained from the shadow range. This other value is computed by determining the location of the stored address value within the first range and selecting the shadow address value which has the corresponding location in the shadow range. Preferably, this is performed by adding the offset to the stored address value. The value of the offset preferably is stored in the program memory 20.

To illustrate, the first address range can be 08-00-2B-00-00-00 through 08-00-2B-1F-FF-FF, and the shadow address range can be 08-00-2B-40-00-00 through 08-00-2B-5F-FF-FF. Consequently, if the stored address value is 08-00-2B-10-41-A1, the microprocessor 18 will process this stored value, and select 08-00-2B-10-41-A1 and 08-00-2B-50-41-A1 as the addresses.

Of course, not all stored address values need have corresponding shadow address values. Instead, the first range of stored address values having corresponding shadow addresses can be a portion of a larger, third range. The first range can consist of those values of the third range above or below a threshold address value, or simply between two boundary address values.

Figure 3:
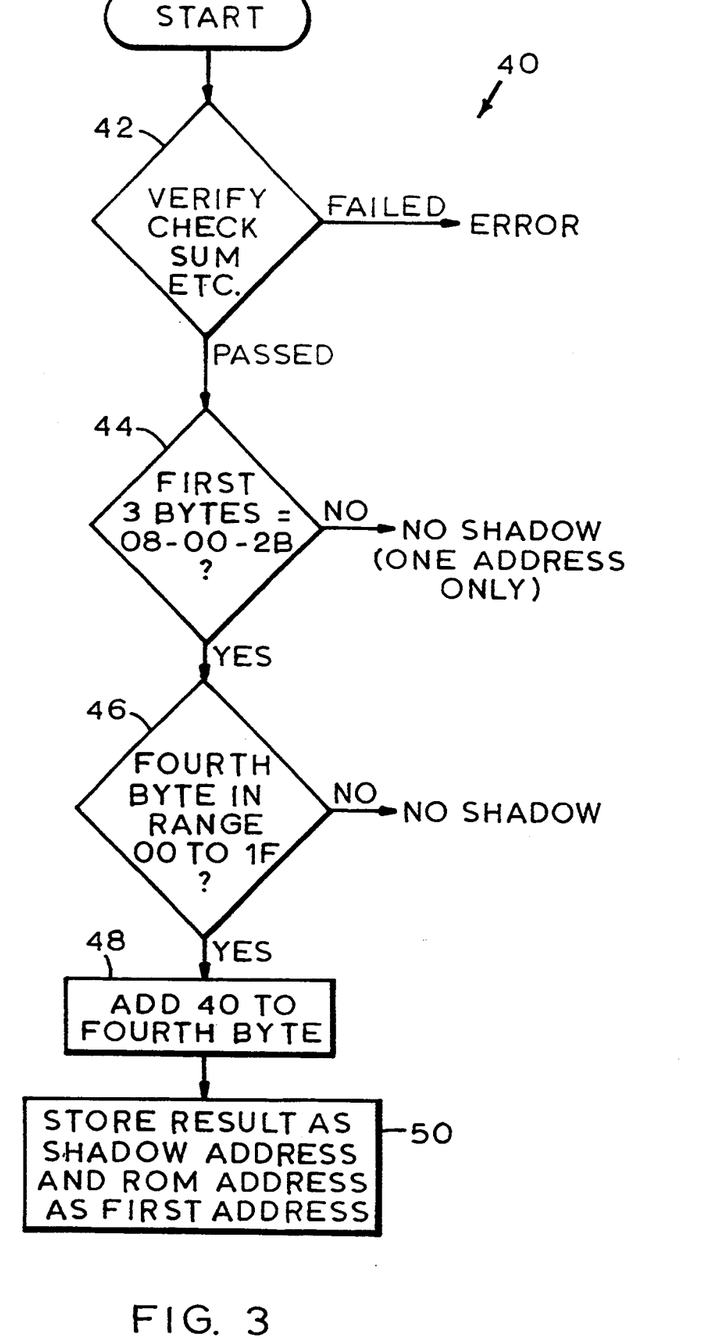

This will be made clear with reference to FIG. 3, which shows an algorithm 40 in flow chart form for determining addresses based on the stored address information in the address memory 24a of FIG. 2a. The algorithm 40 is stored as a program in program memory 20, and is called and executed by the microprocessor 18.

In step 42, the microprocessor 18 tests the address information fetched from the address memory 24. The test includes verifying the checksum and test pattern to ascertain whether the fetched address information accurately provides an address value. If the address information fails, an error is indicated. Otherwise, in steps 44 and 46, the microprocessor 24 tests whether the provided address value falls within the specified first range for which exists shadow address values.

Specifically, in step 44, the first three bytes of the stored address value are tested to determine whether they equal a pre-selected threshold, in the example given, 08-00-2B. If they are not, then no shadow value exists, and the stored address value is the sole address to be obtained by the processor. If they are equal, however, then, in step 46, the microprocessor 24 tests whether the fourth byte falls within the range 00 to 1F. Again, if it does not, no shadow address value exists; if it does, a shadow address can be computed.

The computation of the shadow address value is performed in step 48. There, a constant, "C" (i e., a positive or negative integer), equal to the offset between the first address range and the shadow address range is fetched from the program memory 20 and added to the stored address value from the address memory 24. In the example, C equals 40, so this number is added to the fourth byte of the address value. Then, in step 50, the result of this computation is stored as the shadow address, and the address value obtained from the address memory is stored as the first address.

Thus, for the example given above, the algorithm 40 results in a first address equal to the stored address value (i.e., 08-00-2B-10-41-A1) and a second address equal to the shadow address value (i.e., 08-00-2B-50-41-A1).

These addresses, for instance, are stored in memory locations 20a (FIG. 1) in the program memory 20, which are identified with or otherwise correspond to the port 12, 14 or central logic unit 16. In this way, each address is available for subsequent use, for example, to uniquely identify the component to which it corresponds. For example, when device 10 is a bridge or other multi-port communication device whose processor generates packets, the stored addresses can be used as source addresses incorporated into the packets prior to forwarding. By the same token, when device 10 is a router or other multi-port communication device to which packets ar expressly addressed, the stored addresses can be used as destination addresses incorporated into the packets by other stations connected to the device, and used by the device to recognize packets sent to it.

The above-described first embodiment is well suited for an application in which two addresses are desired, and particularly when it is desired to derive the two addresses from a single value stored, for example, in a single, conventional address memory. Thus, this embodiment can be utilized by suitably programming a bridge having a conventionally formatted, single-address-containing 32×8 address PROM, for example.

Of course, where three or more addresses are desired, they can be computed using a plurality of shadow address ranges. Each shadow range must be at a pre-selected offset to the first address range that includes the stored address value. (Generalizing, where the positive integer "N" equals the number of addresses desired, "N−2" shadow ranges are required. Thus, N−1 offsets are required to compute the shadow addresses.)

Rather than using an offset which is added to the stored address value to compute the shadow address value, those skilled in the art will appreciate that other mathematical techniques, including, for example, subtraction, multiplication, division, transposition, use of a more complicated shadow-value-generation polynomial, or various translation techniques, could be employed as well.

A variation of the first embodiment is to provide an address memory which stores both an address value from the first address range and a second address value from the shadow address range. In that way, two addresses can be provided without requiring two separate address memory chips.

ALTERNATIVE EMBODIMENT

The invention can be practiced to provide, more efficiently, numerous address values. To that end, and with renewed reference to FIG. 1, the bridge 10 has an address memory 24 which, unlike the earlier embodiment, preferably stores two, different address values, called the "first" and "last" address values. When these address values are interpreted as integers, with the first byte of each value being the most significant byte, etc., the first and last address values define the start and end of a range of consecutive numbers. This range corresponds to the set of address values assigned to the bridge 10.

In other words, the number of address values in the specified range, i.e., the difference between the two stored address values, equals the number of addresses available or assignment to identify the ports 12, 14 and, if desired, the central logic unit 16 of the bridge 10.

Figure 4:
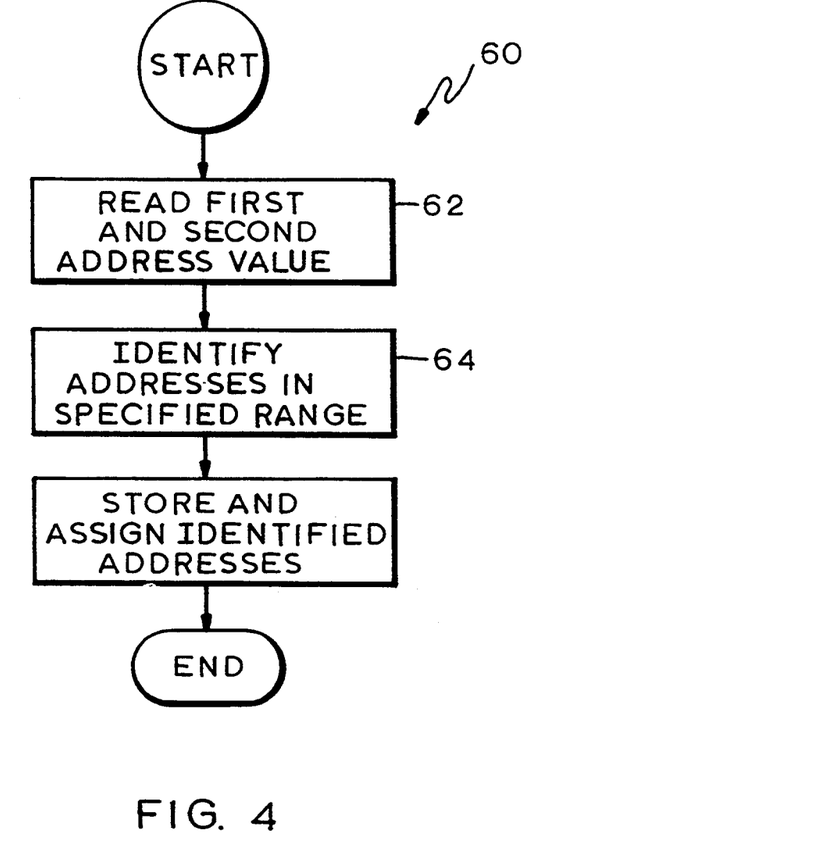
FIG. 4 is a flow chart of an algorithm for computing a plurality of addresses from a range specified by address values stored in the address memory depicted in FIG. 2b.

As illustrated in the algorithm 60 of FIG. 4, the processor 18 computes the set of addresses by reading the address information including the two address values out of the address memory 24 in step 62; after initialization, determining the set of available addresses in step 64; and, then, in step 66, assigning them to the appropriate ports 12, 14 and central logic unit 16 pursuant to an algorithm stored in the program memory 20. (For simplicity, the testing of checksums and verification of test patterns as described in conjunction with FIG. 3 are not shown in FIG. 5, though normally would be conducted during initialization.) The processor also verifies that the number of addresses specified by the address-ROM is sufficient to meet the needs of the packet relaying device.

The set of addresses specified by the address memory contents and determined by the processor 18 consists of all the addresses in the range from the first to the second value, inclusive, including the stored values.

Figure 2B:
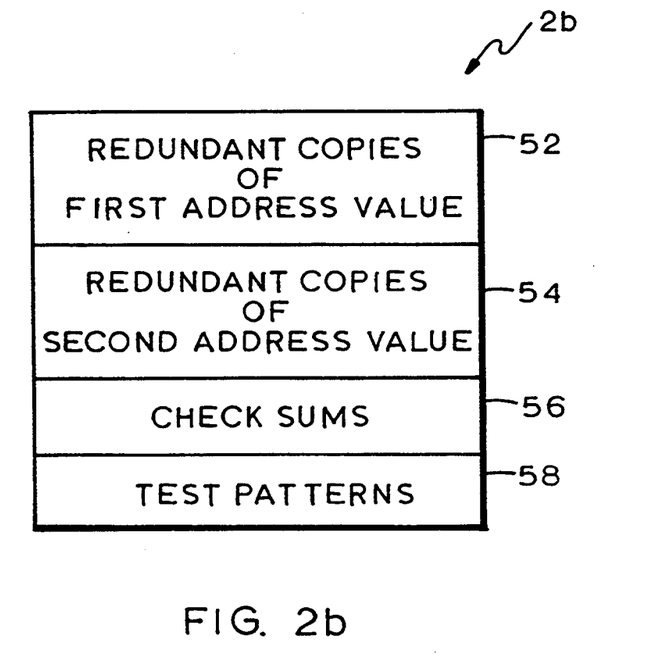

FIG. 2b depicts a suitable address data structure 24b for implementing this embodiment of the invention. The address data structure 24b includes: (i) a first set of fields 52 providing redundant copies of a first address value, (ii) a second set of fields 54 providing redundant copies of a second address value, (iii) a third set of fields 56 providing checksums of those values for purposes of error detection, and (iii) a forth set of fields 58 providing test patterns for purposes also of error detection.

Figure 5:
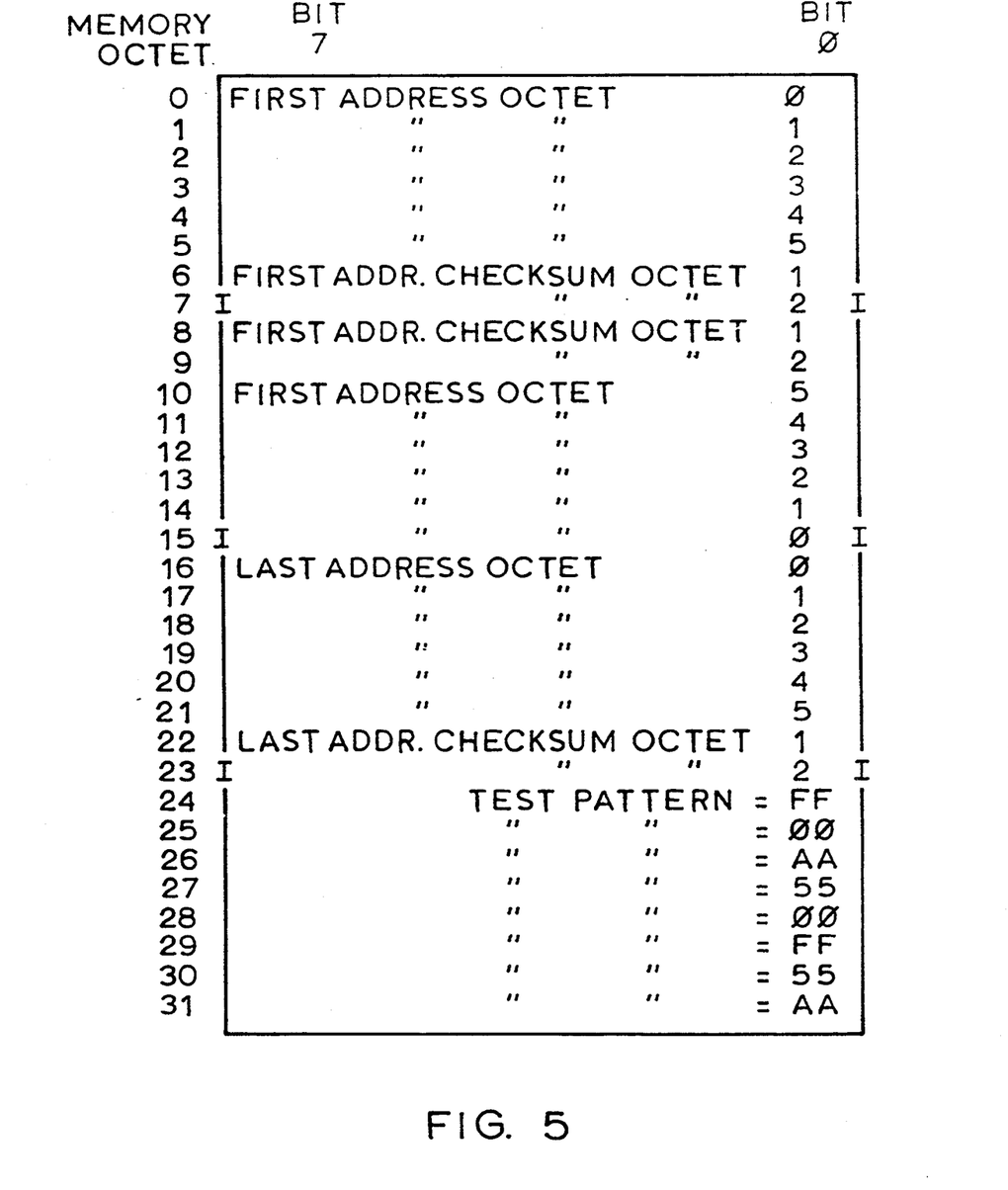
FIG. 5 is a more detailed representation of the address memory of FIG. 2b.

A more specific example of a suitable format for the address data structure 24b, when implemented in a 32×8 address memory, is depicted in FIG. 5. As shown, in this example, the address value octets are numbered consecutively from 0 through 5, with the most significant octet being 0, and the least significant being 5. Similarly, the octets of the address memory itself are numbered from 0 through 31 along the left side of the figure. The memory octets 0 through 5 contain a first address value. Memory octets 6 through 9 contain checksums for the first address value. Memory octets 10 through 15 contain the first address value in reverse order. Memory octets 16 through 21 contain a second or last address value. Memory octets 22 through 23 contain checksums for the second address value. Finally, memory octets 24 through 31 contain test patterns, e.g., FF-00-AA-55-00-FF-55AA.

The test pattern for data structure 24b can be chosen to be distinct from that for data structure 24a, and therefore serve as a flag which identifies which type of data structure 24a or 24b is stored in the address memory 24. (By having both test patterns of data structures 24a and 24b distinct from that used in the prior art address memories, the test pattern can be used as a flag to indicate whether the processor can derive other address values from that specified by the memory.)

Alternatively, in a variation of this embodiment, the address memory 24 can store a single address value plus a constant which, when added to the stored address value, yields a second address value, and, thus, the range of address values available for assignment. Consequently, the start and end addresses are still specified by the stored information in the address-ROM. In another, though not preferred, variant of this embodiment, a single address is stored and the processor is programmed to provide e.g., a fixed length used to compute the address range.

Figure 6:
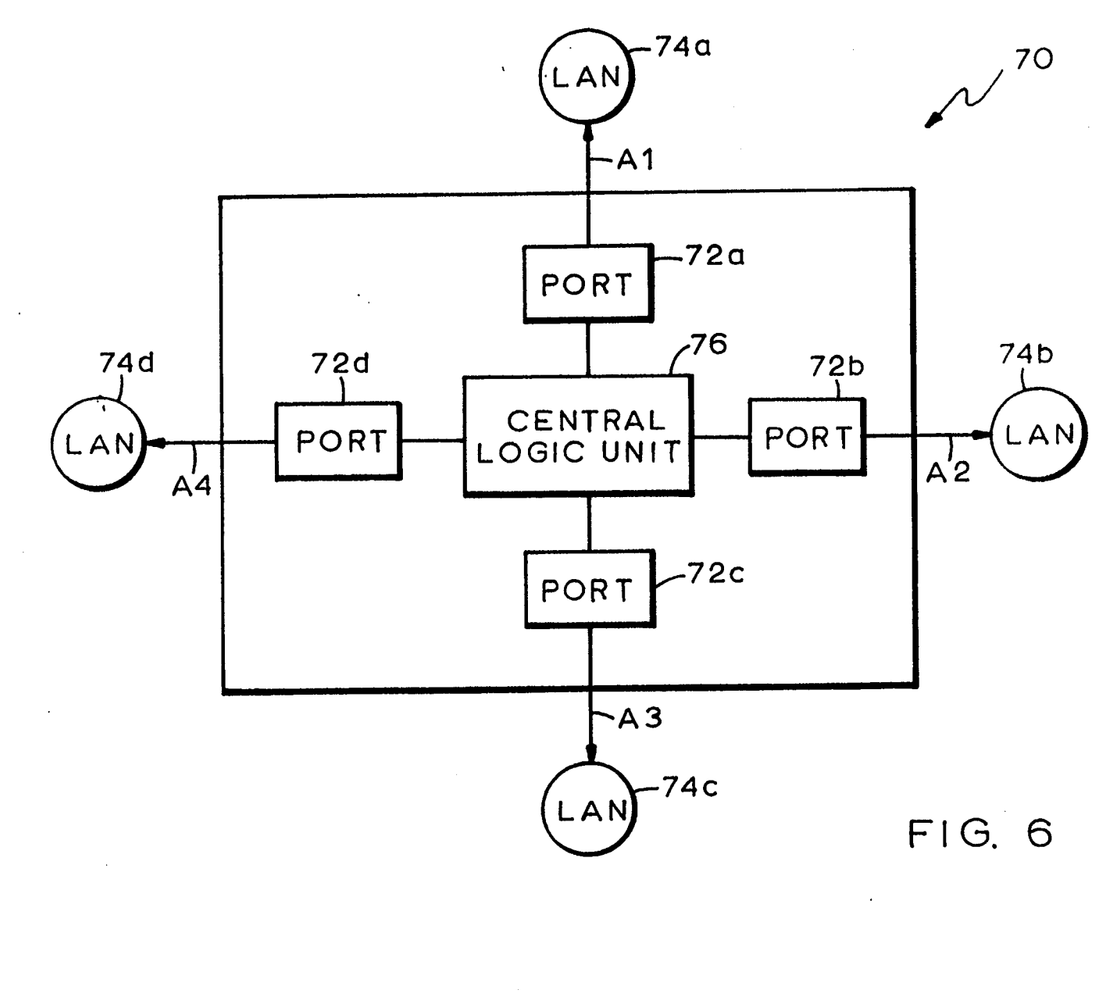
FIG. 6 is a block diagram of multiple networks interconnected by a bridge having an address memory in accordance with FIG. 2b.

FIG. 6 is a block diagram of a specific illustrative implementation of the invention, in which a bridge 70 has more than two ports (four are shown) designated 72a–72d, for interconnecting a like-number of networks 74a–74d. The bridge 70 has a central logic unit 76 for storing a data structure in accordance with FIG. 2b, in which four addresses A1–A4 fall within the specified range. The central logic unit 76 of the bridge 70 derives these addresses as described above in conjunction with the alternative embodiment of the invention, and assigns each one as a unique port address for a corresponding one of the networks 74a–74d.

The foregoing description has been limited to specific embodiments of this invention. It will be apparent, however, that variations and modifications can be made to the invention, with the attainment of some or all of its advantages.

For example, in the first-described embodiment, neither the first range nor shadow range of address values need be sequential or consecutive; rather, any two groups or blocks of different values, such as first and second groups consisting of respective odd and even values, can be used. Furthermore, the attachments to a packet relaying device which incorporates the invention need not be networks; rather, the attachments can be stations, peripherals or other devices. In addition, the invention can be practiced advantageously in devices other than packet relaying devices, wherever multiple addresses are required.

Accordingly, it is the object of the appended claims to cover all variations and modifications as come within the true spirit and scope of the invention.

What is claimed is:

1. A packet relaying device comprising:
   A) first and second port means for transmitting a plurality of packets, said first and second port means being identified for communication by respective first and second port addresses that are unique on any computer network to which said ports are connectable;
   B) a packet memory for storing packets;
   C) a main memory;
   D) a single, read-only memory for storing information specifying a first address value; and
   E) a processor in communication with said packet, main and read-only memories and said first and second port means
      (i) for processing packets stored in said packet memory in accordance with a program stored in said main memory, and
      (ii) for mathematically manipulating said first address value to determine therefrom a second address value; and
   F) said main memory including first and second memory locations for respectively storing said first and second address values as said first and second port addresses.

2. The packet relaying device in accordance with claim 1, wherein said first address value is one of a first plurality of address values included in a first block of address values, each of said first plurality of address values corresponding to one of a second plurality of address values included in a second block of address values, and wherein said processor derives said first and second address values by identifying the address value of said second plurality of address values which corresponds to said first address value, said identified address value being said second address value.

3. The device in accordance with claim 2, wherein each of said corresponding first and second address values has a numerical difference equal to said predetermined number.

4. The packet-relaying device in accordance with claim 2, wherein said first address values of said first block comprise consecutive numbers, and said second address values of said second block comprise consecutive numbers, and wherein each of said first address values bears a numerical relationship to said corresponding second address value equal to an offset between said first and second blocks, and said processor determines said corresponding second address value by adding said offset to said first address value.

5. The packet-relaying device in accordance with claim 4, wherein said read-only memory is implemented on a separate chip from said packet and main memories.

6. The packet-relaying device in accordance with claim 1, wherein said processor mathematically manipulates said first address by adding a pre-determined constant to said first address value to yield said second address value.

7. The packet relaying device in accordance with claim 1, said address information stored in said read-only memory representing said first address value.

8. The packet relay device in accordance with claim 1, wherein said processor mathematically manipulates said first address value to derive said second address value by performing one of the following mathematically techniques:
   a) adding a constant to said first address value; and
   b) subtracting a constant to said first address value.

9. A bridge comprising:
   A) first and second ports for communication with respective first and second attachments identified by a plurality of attachment addresses, said first and second ports being identified for communication by respectively corresponding first and second port addresses that are different from said attachment addresses and from each other,
   B) a central logic unit connected to said ports, including
      i) a single, read-only memory for storing address information specifying a first address value,
      ii) a programmable processor connected to said ports and said read-only memory for mathematically manipulating said first address value to derive therefrom a plurality of address values, and
      iii) a packet memory connected to said ports for storing a packet received through one of said ports, and
      iv) a data memory separate from said read-only memory and connected to said processor for storing said plurality of address values, each of said stored address values specifying one of said first and second port addresses.

10. The bridge in accordance with claim 9, wherein said processor derives said first and second port addresses by using said first address value as said first port address, and adding a pre-determined constant to said first address value to obtain said second port address.

11. The bridge in accordance with claim 10, wherein said first address value falls within a pre-selected first range, said pre-determined constant comprises an offset into a pre-determined second address value range, said first and second address value ranges are non-overlapping, and said second address comprises an address value in the second range that corresponds to said first address value in said first range.

12. The bridge in accordance with claim 9 wherein said address memory stores first and second address values, and said processor derives said plurality of addresses by using said first and second address values to define a range of a plurality of address values.

13. The bridge in accordance with claim 9, wherein said processor mathematically manipulates said first address value to derive a second address value by performing one of the following mathematically techniques:
   a) adding a constant to said first address value; and
   b) subtracting a constant to said first address value.

14. In a packet-relay device comprising a plurality of ports coupled for communication with a plurality of other devices of a computer system, each of said other devices being identified by a device address, each of said ports being identified by one of a plurality of port addresses that are different from said device addresses and from each other, said packet-relay device further comprising a read-only memory for storing address information including a stored first address value, said stored first address value comprising a plurality of bytes including a most significant byte and a least significant byte, a method for generating a plurality of said port addresses for use in identifying said ports, said method comprising the steps of:
   A) providing a first address value range comprising a plurality of first address values including said stored first address value, and a second address value range comprising a plurality of second address values, said first and second address value ranges being non-overlapping, each of a first plurality of said first address values corresponding to at least one second address value;
   B) interpreting said stored first address value as an integer;
   C) if said stored first address value comprises one of said first plurality of said firs address values having at least one corresponding second address value, determining the at least one second address value corresponding thereto by
      i) obtaining a first offset between said first address value range and said second address range; and
      ii) adding said offset to said stored first address value to obtain the at least one corresponding second address value; and
   D) storing said first and second address values in respective first and second memory locations of a memory separate from said read-only memory for use as said port addresses.

15. The method in accordance with claim 14, further including the step of determining whether said stored first address value comprises one of said first plurality of said first address values having at least one corresponding second address value by comparing said most significant byte with a predetermined threshold to determine whether a pre-determined mathematically relationship exists therebetween that signifies that said stored address comprises one of said first plurality of address values having at least one corresponding second address value.

16. The method in accordance with claim 14, wherein step (C) includes:
   i) obtaining a plurality of offsets between said first address value range and said second address values in said second address range, said offsets including said first offset;
   ii) adding each of said offsets to said stored first address value to obtain a plurality of the corresponding second address values.

17. In a packet-relay device comprising a plurality of ports coupled for communication with a plurality of other devices of a computer system, each of said ports being uniquely identified by one of a plurality of port addresses, each of said other devices being identified by a device address that is different from the others of said device addresses and different from said port addresses, said packet-relay device further comprising a read-only memory for storing address information including first and second address values, a method for generating said port addresses comprising the steps of:
   A) interpreting said first and second address values as specifying a starting and ending address value of a range of consecutive address values; and
   B) assigning said consecutive address values to said ports as said port addresses, wherein the number of address values in the range, i.e., the difference between the first and second address values, equals the number of assignable port addresses.

18. In a packet-relay device comprising a plurality of ports coupled for communication with a plurality of other devices of a computer system, each of a plurality of ports being uniquely identified by one of said port addresses, each of said other devices being identified by a device address that is different from the others of said device addresses and different from said port addresses, said packet-relay device further comprising a read-only memory for storing address information including a first address value, said method comprising the steps of:

A) interpreting said first address value as an integer;

B) mathematically adding a constant stored in said packet-relay device to said first address value to obtain a second address value; said first and second address values comprising starting and ending address values of a range of consecutive address values; and C) assigning said consecutive address values to said ports as said port addresses, wherein the number of address values in the range, i.e., the difference between the first and second address values, equals the number of assignable port addresses.

* * * * *